United States Patent [19]

George

[11] Patent Number: 5,122,564
[45] Date of Patent: Jun. 16, 1992

[54] MELT STABILIZED POLYKETONE BLEND CONTAINING GLASS FIBERS AND A TRIBASIC CALCIUM PHOSPHATE

[75] Inventor: Eric R. George, Houston, Tex.
[73] Assignee: Shell Oil Company, Houston, Tex.
[21] Appl. No.: 716,153
[22] Filed: Jun. 17, 1991
[51] Int. Cl.⁵ .............................................. C08K 3/32
[52] U.S. Cl. .................................... 524/417; 524/414; 524/415; 524/449; 524/492; 524/442
[58] Field of Search ............... 524/414, 415, 417, 442, 524/449, 494

[56] References Cited

U.S. PATENT DOCUMENTS

| | | |
|---|---|---|
| 4,843,144 | 6/1989 | Van Broekhoven et al. ...... 528/392 |
| 4,851,470 | 7/1989 | George ................. 524/612 |
| 4,874,801 | 10/1989 | George et al. ........ 523/214 |
| 4,880,865 | 11/1989 | George ................. 524/449 |
| 5,021,496 | 6/1991 | Machado et al. ..... 524/417 |

Primary Examiner—Paul R. Michl
Assistant Examiner—Tae H. Yoon
Attorney, Agent, or Firm—James O. Okorafor

[57] ABSTRACT

A stabilized polymer composition comprising a linear alternating polymer of carbon monoxide and at least one ethylenically unsaturated hydrocarbon, at least one reinforcement material, and a melt stabilizing agent. A process of preparing the composition and articles of manufacture produced from the composition are also disclosed.

17 Claims, No Drawings

MELT STABILIZED POLYKETONE BLEND CONTAINING GLASS FIBERS AND A TRIBASIC CALCIUM PHOSPHATE

FIELD OF THE INVENTION

This invention generally relates to polyketone polymers. More particularly, this invention relates to a stabilized polyketone polymer composition comprising the polymer, glass fibers and/or mineral filler(s), and a melt stabilizing agent.

BACKGROUND OF THE INVENTION

Polyketone polymers are generally known in the art. Of particular interest among polyketone polymers is the class of linear alternating polymers of carbon monoxide and at least one ethylenically unsaturated hydrocarbon. This particular class of polyketone polymers is disclosed and claimed in numerous patents assigned to Shell Oil Company.

The addition of glass fiber and/or mineral fillers to reinforce polyketones is known in the art. Glass fibers, mica, and talc are examples of reinforcing materials or fillers that have been and are still being used.

It is known that these polyketone polymers have stability problems. These stability problems include ultraviolet (UV), melt stability, and heat aging stability. It has been suggested that the melt stability problem is caused by the tendency of the polymer to crosslink, especially at melt processing temperatures. It is known that glass fibers and mineral fillers in spite of their desirability tend to accelerate the crosslinking of the polymer, thereby excarbeting the problem of melt stability.

In spite of the successes that have been achieved towards melt stabilizing polyketones, the ideal melt stabilizing agent is yet to be discovered. Therefore, there continues to be a need and/or search for materials that can effectively melt stabilize polyketones.

It is a discovery of this invention that the addition of an effective amount of tribasic calcium phosphate (calcium apatite) to a glass fiber reinforced and/or mineral filled polyketone blend, provides a melt stabilizing effect to the polymer during melt processing.

SUMMARY OF THE INVENTION

It is a general object of this invention to provide a stabilized polyketone blend.

It is a further object of this invention to provide a stabilized polyketone blend having good mechanical properties.

It is a particular object of this invention to provide a glass fiber reinforced melt stabilized polyketone blend.

It is yet an objection of this invention to provide a mineral filled melt stabilized polyketone blend.

In accordance with this invention, it is now provided a melt stabilized glass fiber reinforced and/or mineral filled polyketone blend having good mechanical properties, comprising a major portion of a linear alternating polymer of carbon monoxide and at least one ethylenically unsaturated hydrocarbon, a minor portion of glass fiber reinforcers, or a mineral filler or mixtures of both, and tribasic calcium phosphate in an amount effective as a melt stabilizer.

DETAILED DESCRIPTION OF THE INVENTION

The materials useful in practicing this invention include a linear alternating polymer of carbon monoxide and at least one ethylenically unsaturated hydrocarbon (simply referred to as a polyketone polymer), glass fiber reinforcers, a mineral filler and tribasic calcium phosphate. In general, the practice of this invention involves suitably admixing suitable quantities of the useful materials to form a stabilized polyketone polymer composition.

The resulting polyketone polymer composition has utility as a thermoplastic material for example in the manufacturing and coating of articles. These articles can be shaped articles such as containers for food and drink, and parts for the automotive industry, including sucker rods, gears, and valve covers. These articles are produced by conventional methods exemplified by injection molding, and thermoforming.

THE POLYMER

The polyketone polymers which are employed as the major component of the filled polymer compounds of the invention are of a linear alternating structure and contain substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms, and are aliphatic such as ethylene and other $\alpha$-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an $\alpha$-olefin such as propylene.

When the preferred polyketone polymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

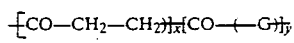

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO—CH$_2$CH$_2$— units and the —CO—G— units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 (Van Broekhoven et al.). The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atomosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

GLASS FIBER REINFORCERS

The term "glass" is employed in the conventional meaning to indicate that class of complex metal silicates which are commonly referred to as glasses. Although the addition of rare earth metal oxides or transition metal oxides to other metal silicates on occasion will produce a glass of rather exotic properties, the glass from which the glass fiber of the invention is produced is the more common alkali metal silicate glass, particularly a sodium silicate glass. Fibers produced of such glass are conventional and are commercially available from a number of U.S. and foreign glass companies. The fibers are useful as reinforcements for polymeric products and are commercially used as such. However, the physical dimensions of the glass fibers are of some importance to successful utilization in a particular application as are the presence or absence of a sizing material or a coupling agent for the glass and the nature of the sizing or coupling agent.

In the compositions of the invention, the glass fibers which contribute the most desirable properties to the composition are chopped glass fibers of circular cross-section. The fibers range in diameter from about $2 \times 10^{-4}$ inch to about $8 \times 10^{-4}$ inch, preferably from about $4 \times 10^{-4}$ inch to about $7 \times 10^{-4}$ inch. Fibers of greater or lesser diameter are satisfactory but fibers of too small a diameter do not provide the desired strength and fibers of too large a diameter contribute too much weight for the resulting strength and may not be economical. Although in some applications the long continuous fibers of glass are satisfactory, in the compositions of the invention it is preferred to use short fibers of glass. Lengths of glass fiber from about 0.1 inch to about 0.5 inch are suitable. While somewhat longer or somewhat shorter lengths are also useful, too long a glass fiber detracts from the processability of the composition while too short a fiber does not provide the desired strength. It is recognized that the actual length of the glass fibers in the composition will depend to some extent upon the method of blending or mixing the components, as this may mechanically break down the length of the glass fibers.

The glass fibers to be used as reinforcements for plastic materials may be treated with a sizing material or a coupling agent, which terms are often used interchangeably. Such treated glass fibers are known in the art and are commercially available. The nature of the sizing or coupling agent will influence the interfacial shear strength of the fiber and the polymer matrix, i.e., the degree to which the polymer and glass fiber will adhere. Improvement in mechanical properties, such as tensile strength, result when a relatively high degree of adhesion occurs between the polymer and the fiber. To contribute strength to a polymer blend, the interfacial shear strength will be at least comparable in magnitude to the shear strength of the polymer so that there will be good adhesion between the polymer and the glass fiber. The interfacial shear strength is influenced by the polarity of the polymer so that for some polymers certain sizings or coupling agents work better than others. For the case of blends containing polyketone polymers a variety of sizings are suitable. Such sizings are generally characterized by the general nature of the size rather than the specific chemical structures which are often proprietary to the glass fiber manufacturer. Suitable sizings include water emulsions of starch and lubricating oil, aqueous dispersions of surface active materials and lubricants, silicon-containing materials such as vinyl silanes, alkyltrimethoxysilanes, amino silanes, trimethoxysilanes which may also contain urethane, acrylate or epoxy functionalities, and non-polar hydrocarbons. For use in the blends of the invention, polar sizings are preferred, such as a sizing having a trimethoxysilane end group attached to a hydrocarbon chain with a terminal urethane functionality, although other hydrocarbon sizings having a trimethoxysilane end group are also quite suitable. Such fibers are commercially available and are exemplified by OCF 492, OCF408BD, and OCF 457 Fiberglass which are available from Owens-Corning Fiberglass. OCF 408BD has a polar sizing which is useful for producing high strength glassfiber reinforced polyketones.

MINERAL FILLERS

Mineral fillers useful in the practice of this invention include mica, talc, clay, silica, calcium carbonate, calcium carbonate coated with an acidic substance such as stearic acid, wollastonite, franklinite and/or mixtures thereof. Kaolin clay 90A 6 from J. M. Huber and microwhite WAM SSA-458 from ECC International (a stearic acid coated calcium carbonate) are expected to be useful herein.

These mineral filler components are used with the novel polyketone to improve modulus, tensile strength, and HDT (heat distortion temperatures at 66 psi and 264 psi).

The mineral filler may aid to reduce and/or control mold shrinkage of the resultant polyketone polymer blend. Physical and thermal properties of the resultant polymer blend may be affected by the characteristics of the mineral fillers, such as the shape of the filler particles, the size of the filler particles, the size distribution of the filler particles, and surface area of the filler particles. For example, wollastonite, with a specific gravity of 2.9, hardness of 4.5, melting point of 1540° C., and water content of 0.5% has significantly different characteristics from a substance such as mica with a specific gravity of 2.74–2.95, hardness of 2.4–3 and a melting point of 1300° C. Wollastonite is expected to improve the heat deflection temperature of the polyketone polymer as well as reduce the polyketone's thermal expansion coefficient, increase density of the blend and reduce the polymer's mold cycle time.

Table I provides details on some fillers that should be particularly usable herein:

TABLE I

| | Wollastonite | Aluminum Trihydrate | Talc | Silica | Clay | Franklinite |
| --- | --- | --- | --- | --- | --- | --- |
| Water Content (%) | 0.5 | 34.6 | 4.8 | <0.1 | 0.5 | <1.0 |
| Specific Gravity | 2.9 | 2.42 | 2.7–2.8 | 2.65 | 2.50 | 3.0 |
| Hardness (Mohs) | 4.5 | 2.5–3.5 | 1.0 | 7.0 | 4.0–6.0 | 2.0 |
| Melting Point (°C.) | 1540 | 200–600 | Stable to 380 | Stable to 573 | 1810 | — |
| Shape | Fiber | Plates | Plates | Spheres | Plates | Fibers |

Mica usable herein is typically in the physical form of flat, long platelets having a high aspect ratio, i.e., a ratio of length of the particle to thickness of that particle of up to 20:1, preferably of up to 100:1. The use of the flat, plate-like mica particles provides increased barrier properties, presumably through a reduction in the rate of diffusion of a gas or liquid through the glass filled polymer as the diffusing species must travel a tortuous path around platelets through the polymer.

The micas which are suitably employed in the invention are silicate materials characterized physically as flat, six-sided monoclinic crystals which undergo a nearly perfect basal cleavage to yield the thin, flexible flakes. The actual chemical composition will vary over a range of micas. Phlogopite is a preferred mica but other natural or synthetic micas such as muscovite, biolite, fluorophlogopite, and arium fluorophlogopite, and barium disilicate can be used. Micas are further discussed in Kirk Othmer, Encyclopedia of Chemical Technology, 2nd Ed., Vol. 13, pp. 398–424, incorporated herein by reference.

MELT STABILIZING AGENT

The melt stabilized polyketone compositions comprise a melt stabilizing hydroxyapatite of the formula $M_{10}(PO_4)_6(OH)_2$, where M is barium (Ba), strontium (Sr), or calcium (Ca). The preferred hydroxyapatite is calcium hydroxyapatite, $Ca_{10}(PO_4)_6(OH)_2$, a naturally occurring calcium phosphate and the major constituent of bone and tooth mineral. It is a finely divided, crystalline, non-stoichiometric material rich in surface ions which are readily replaced by fluoride ions. Calcium hydroxyapatite is also referred to as tribasic calcium phosphate.

OTHER ADDITIVES

The stabilized polymer composition of the invention may also include other additives such as antioxidants, dyes, other fillers or reinforcing agents, fire resistant materials, mold release agents, colorants and other materials designed to improve the processability of the polymers or the properties of the resulting compound. Such additives are added prior to, together with, or subsequent to the blending of the polyketone, glass fibers, mineral fillers, and tribasic calcium phosphate.

AMOUNTS OF MATERIALS AND PROCESS

The stabilized polymer compounds of the invention comprise a major amount, on a volume basis, of the linear alternating polymer of carbon monoxide and at least one ethylenically unsaturated hydrocarbon with lesser amounts of the other components. The amount of tribasic calcium phosphate present in the stabilized compounds of the invention is not critical, as long as other important polymer properties for the intended use are not adversely affected. Amounts of tribasic calcium phosphate present in the stabilized composition is on a weight basis from about 0.005 to about 10.0, and preferably from about 0.1 to about 3.0. Qualitatively speaking, tribasic calcium phosphate is required in an amount sufficient to effectively function as a melt stabilizer.

The method of producing the stabilized polymer compounds of the invention is not material so long as a relatively uniform distribution of glass fibers and/or mineral filler, and the tribasic calcium phosphate throughout the polyketone is obtained. The tribasic calcium phosphate exists as a discrete phase in the polyketone matrix. The method of producing the compounds is that which is conventional for filled polymeric compounds. In one modification, the tribasic calcium phosphate, glass fibers, mineral filler and polyketone are mixed and passed through an extruder operating at high RPM to produce the stabilized compound as an extrudate. In an alternate modification, the components are blended in a mixing device which exhibits high shear.

While not wishing to be bound by any particular theory, it is believed that the advantageous results of the invention are obtained because the tribasic calcium phosphate has ion exchange and acid scavenging properties that allow it to neutralize the effect of ionic or acidic species that accelerate a viscosity increase in the polyketone polymer in the melt state. Since few polymers exhibit such a tendency towards viscosity increase, the use of tribasic calcium phosphate as a melt stabilizer for the polyketone polymer is particularly advantageous, providing melt stabilized compositions that are readily processable into materials which exhibit useful mechanical properties.

The following examples and tables further illustrate the various aspects of the invention.

EXAMPLE 1

Preparation of Polymer

A linear alternating terpolymer of carbon monoxide, ethylene, and propylene (89/052) was produced in the presence of a catalyst composition formed from palladium acetate, trifluoroacetic acid and 1,3-bis[di(2-methoxyphenyl)phosphino]propane. The polyketone polymer had a melting point of about 223° C. and an LVN of about 1.1 dl/g when measured in m-cresol at 60° C. The polyketone polymer also contained 0.5% Ethanox 330 and 0.5% Nucrel 535.

EXAMPLE 2

Preparation of Samples

Samples were prepared by dry blending pellets of the polyketone polymer of Example I, with tribasic calcium phosphate. The glass fibers reinforcers and mica were then blended downstream in a corotating twin screw extruder. These samples contained varying amounts of tribasic calcium phosphate, glass fibers, and mica. The samples were numbered 1 to 4 and are shown in Table II.

TABLE II

| Sample No. | Wt. % Mica/Fiberglass | Wt. % Ca Apatite |
| --- | --- | --- |
| 1 | 10/20 | 1 |
| 2 | 10/20 | 0 |
| 3 | 20/10 | 1 |
| 4 | 20/10 | 0 |

EXAMPLE 3

Effect of CaApatite on melt stability.

The samples of Table II were compression molded into 30 ml thick plagues at 250° C. These plagues were placed in a paralled plate rheometrics machine and melt viscosity was measured as a function of time at 275° C. The results obtained are shown in Table III.

TABLE III

| Sample No. | VIS @ 0 min (PaSec) | VIS @ 10 min (PaSec) | VIS @ 28 min (PaSec) |
| --- | --- | --- | --- |
| 1 | 900 | 2000 | 12,000 |
| 2 | 1000 | 2300 | 16,000 |
| 3 | 1700 | 4100 | 30,000 |
| 4 | 1800 | 4000 | 40,000 |

The data shows that the increase in melt viscosity with time is less for Sample #1 than it is for Sample #2. This melt stabilizing effect on Sample #1 is due to the presence therein of calcium apatite. A similar melt stabilizing effect of the calcium apatite is also observed for Sample #3.

EXAMPLE 4

The Effect of CaApatite on the Melt Rheology of Reinforced Polyketone Polymers Samples of reinforced polyketone polymers with various amounts and types of reinforcing materials were prepared using the procedures of Example 3. The melt rheology of these samples were measured using the method of Example 3. The components of these samples and their measured melt rheology values are shown in Table IV.

TABLE IV

| Sample No. | VIS @ 0 min (PaSec) | VIS @ 10 min (PaSec) | VIS @ 28 min (PaSec) |
| --- | --- | --- | --- |
| 1. 90/064 CONTROL | 77 | 157 | 745 |
| 2. +30% OCF 408BC | 379 | 4100 | 31200 |
| 3. +30% OCF 408BC +2% CaApatite | 287 | 622 | 1710 |
| 4. +30% Aspralok 100** | 981 | 2614 | 10480 |
| 5. +30% Aspralok 100** +2% CaApatite | 766 | 2840 | 10570 |
| 6. +20% Wollastonite | 376 | 280 | 1695 |
| 7. +20% Wollastonite +2% CaApatite | 172 | 180 | 402 |

*% are wt %.
**mica

From Table IV, it is seen that the addition of 30% glass fiber substantially increased the melt visosity with time: Compare Sample No. 2 vs No. 1. With Sample No. 3 the increase in melt viscosity is substantially reduced. This is attributable to the 2 wt % CaApatite: Compare Sample No. 3 vs No. 2.

Sample No. 4 containing Aspralok shows a negative effect in melt rheology (compare with No. 1). The addition of 2 wt % CaApatite (Sample No. 5) had no effect on the Aspralok. Thus, CaApatite has no melt sabilitizing effect on polyketones reinforced with Aspralok 100.

For Sample No. 6, the Wollastonite causes melt destabilization, although to a lesser degree than that caused by glass or mica. The addition of 2 wt % CaApatite (Sample No. 7) causes an improvement in melt stability—at least to a degree comparable to the control.

The data of Table IV demonstrates that it is not obvious to predict the effect of CaApatite as a melt stabilizer on various polyketone reinforced systems. While it works well with some systems, it has marginal or no effect on other systems.

EXAMPLE 5

Physical Properties of Reinforced Polyketone Polymers

Samples of reinforced polyketones were prepared. These samples contained 30 wt % reinforcement except for Sample No. 1. Physical properties of these samples were measured and are reported in Table V.

TABLE V

| Sample No. | Wt % Mica/Fiberglass | Notched 1200 (ft. lb./in.) | Flex Modulus (psi) | Tensile Strength @ break (psi) | CaApatite |
| --- | --- | --- | --- | --- | --- |
| 1 | 0 | 1.76 | 240,000 | 8,000 | 0 |
| 2 | 30/0 | 0.53 | 1,150,000 | 9,700 | 0 |
| 3 | 0/30 | 2.13 | 1,070,000 | 18,800 | 0 |
| 4 | 10/20 | 1.60 | 1,170,000 | 16,300 | 1 |
| 5 | 10/20 | 1.59 | 1,090,000 | 15,900 | 0 |

TABLE V-continued

| Sample No. | Wt % Mica/ Fiberglass | Notched 1200 (ft. lb./in.) | Flex Modulus (psi) | Tensile Strength @ break (psi) | CaApatite |
|---|---|---|---|---|---|
| 6 | 20/20 | 1.25 | 960.000 | 13.200 | 1 |
| 7 | 20/10 | 1.21 | 1.000.000 | 13.400 | 0 |

The data in Table V demonstrates that reinforcement results in polymers having higher modulus and strength which are useful in many applications. Fiberglass results in better increased impact resistance and strength than mica. However, mica is less expensive, and because of its platelet shaped nature results in improved dimensional stability.

It was also observed that the addition of CaApatite did not have any noticeable effect on these measured physical properties. Thus, although CaApatite selectively functions as a melt stabilizer in some polyketone reinforced blends, it has no effect on the physical properties of these blends.

While this invention has been described in detail for the purpose of illustration, it is not to be construed as limited thereby but is intended to cover all changes and modifications within the spirit and scope thereof.

That which is claimed is:

1. A melt stabilized polymer composition comprising:
   (a) a linear alternating polymer of carbon monoxide and at least one ethylenically unsaturated hydrocarbon;
   (b) glass fiber; and
   (c) tribasic calcium phosphate in an amount effective to function as a melt stabilizer.

2. A composition as in claim 1 wherein the linear alternating polymer is represented by the repeating formula

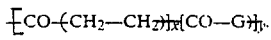

3. A composition as in claim 1 wherein said glass fiber is present in an amount of from about 10 to about 30 wt % based on the weight of the total composition.

4. A composition as in claim 3 wherein tribasic calcium phosphate is present in an amount of up to 2 wt % based on the weight of the composition.

5. A composition as in claim 1, further comprising mica.

6. A composition as in claim 5 wherein said mica and glass fibers is present in an amount of from about 10 to about 30 wt % based on the weight of the total composition.

7. A composition as in claim 6 further comprising up to 2 wt % tribasic calcium phosphate.

8. A composition as in claim 1 further comprising wollastonite.

9. A composition as in claim 8 wherein said wollastonite is present in an amount of from about 10 to 20 wt % based on the total weight of the composition.

10. A composition as in claim 9 further comprising up to 2 wt % tribasic calcium phosphate.

11. A melt stabilized polymer composition comprising:
    a) about 60-70 wt % of a linear alternating polymer of carbon monoxide and at least one ethylenically unsaturated hydrocarbon;
    b) about 10-30 wt % of glass fibers;
    c) about 10-20 wt % of mica; and
    d) 0.1 to 2 wt % of tribasic calcium phosphate.

12. A shaped article of manufacture produced from the melt stabilized polymer of claim 11.

13. A process of producing a melt stabilized polymer of a liner alternating polymer of carbon monoxide and at least one ethylenically unsaturated hydrocarbon involving the steps of suitable admixing to said polymer: (a) glass fiber, and (b) a melt stabilizing amount of tribasic calcium phosphate.

14. A process as in claim 13 wherein said glass fiber is present in an amount of from 10 to 30 wt % of the total composition.

15. A process as in claim 14 containing up to 2 wt % of tribasic calcium phosphate.

16. A process as in claim 13 further comprising mica and wherein said mica and glass fibers are present in an amount of from 10 to 30 wt % of the total composition.

17. A process as in claim 16 containing up to 2 wt % of tribasic calcium phosphate.

* * * * *